US006715801B2

(12) United States Patent
Zhadanov

(10) Patent No.: US 6,715,801 B2
(45) Date of Patent: Apr. 6, 2004

(54) SAFETY QUICK CONNECTION

(76) Inventor: Sam Zhadanov, 2944 W. 5th St., Brooklyn, NY (US) 11214

( * ) Notice: Subject to any disclaimer, the term of this patent is extended or adjusted under 35 U.S.C. 154(b) by 0 days.

(21) Appl. No.: 10/071,289

(22) Filed: Feb. 11, 2002

(65) Prior Publication Data

US 2003/0151253 A1 Aug. 14, 2003

(51) Int. Cl.$^7$ ................................................ F16L 37/08
(52) U.S. Cl. ........................................................ 285/316
(58) Field of Search ........................ 285/81, 82, 84–86, 285/316

(56) References Cited

U.S. PATENT DOCUMENTS 3,601,361 A * 8/1971 Hundhausen et al. .... 251/149.1
3,684,321 A * 8/1972 Hundhausen et al. ........ 285/316
5,305,984 A * 4/1994 Chen ........................ 251/149.1
6,302,447 B1 * 10/2001 Lee .............................. 285/86

* cited by examiner

Primary Examiner—Lynne H. Browne
Assistant Examiner—Giovanna Collins
(74) Attorney, Agent, or Firm—I. Zborovsky

(57) ABSTRACT

A safety quick connection for connecting a source of fluid to a working element has a body connectable to the fluid source, a fitting member connectable to the working element and movable relative to the body, and a locking member, the body, the feeding member and the locking member being formed so that under the action of fluid flowing through the connection from the fluid source to the working element a part of the body engages with a part of the locking member and prevents opening of the connection.

3 Claims, 3 Drawing Sheets

SAFETY QUICK CONNECTION

BACKGROUND OF THE INVENTION

The present invention generally relates to safety quick connections.

More particularly, it relates to safety quick connections for fluid systems, such as hydraulic and pneumatic systems for connecting a fluid source (source of liquid or gas) to a consumer of fluid (a working element etc.). Devices of the above mentioned general type are known in the art. However, the known devices frequently do not provide a reliable safety and if handled improperly can disconnect a fluid supply system under pressure. It is therefore believed to be advisable to provide safety quick connections which eliminate the disadvantages of the prior art.

SUMMARY OF THE INVENTION

Accordingly, it is an object of the present invention to provide a safety quick connection which provides for advantageous results by increasing safety of the connection and preventing its disconnection in fluid systems under pressure.

In keeping with these objects and with others which will become apparent hereinafter, one feature of the present invention resides, briefly stated, in A safety quick connection for connecting a source of fluid to a working element, comprising a body connectable to the fluid source; a feeding member connectable to the working element and movable relative to said body; and a locking member, said body, said feeding member and said locking member being formed so that under the action of fluid flowing through the connection from the fluid source to the working element a part of said feeding member engages with a part of said locking member and prevents opening of the connection.

When the safety quick connection is designed in accordance with the present invention it provides a reliable and safe connection of the corresponding parts, and can not be disconnected during operation of the fluid system under pressure.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
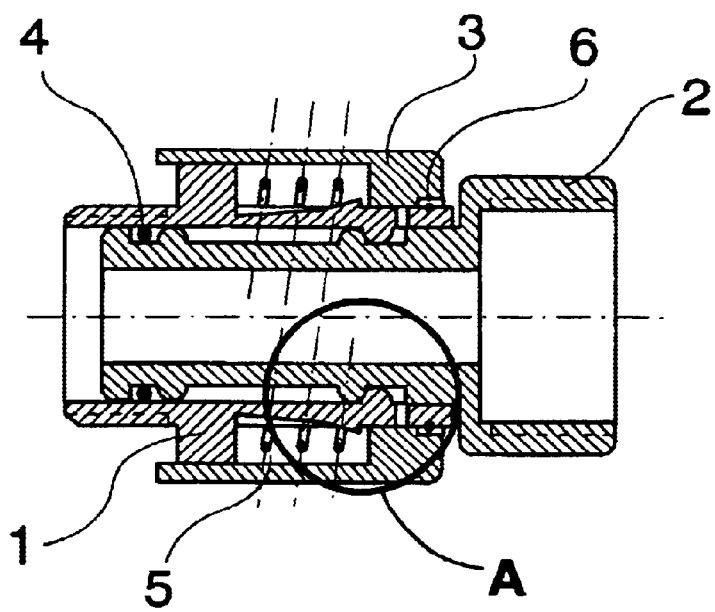
FIG. 1 is a section of a safety quick connection in accordance with the present invention.
Figure 5:
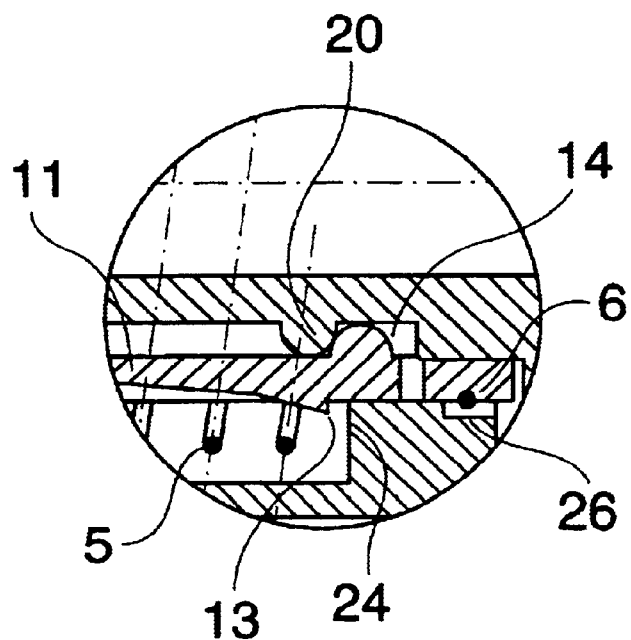
FIG. 5 is a view showing a fragment identified as A in FIG. 1.

A safety quick connection shown in FIG. 1 includes substantially three main components, namely a body 1, a fitting member 2 and a locking member 3. A sealing ring 4 is arranged in a groove of the fitting member. A spring 5 is arranged inside the locking member 3, and a spring ring 6 is arranged in a groove in its outer surface.

Figure 2A:
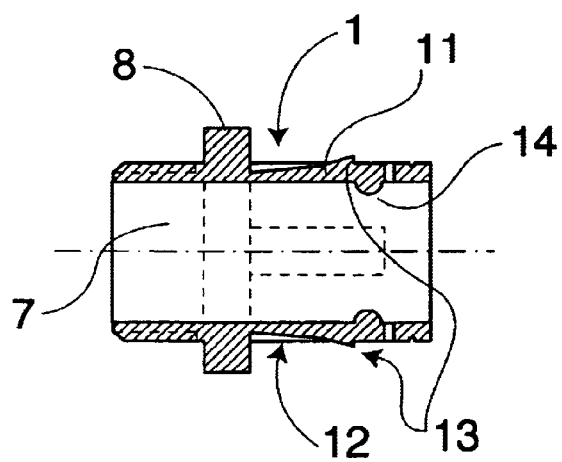
FIGS. 2a, 2b and 2c are views showing a section side view, a section top view and an end view of a body of the inventive safety quick connection.
Figure 2C:
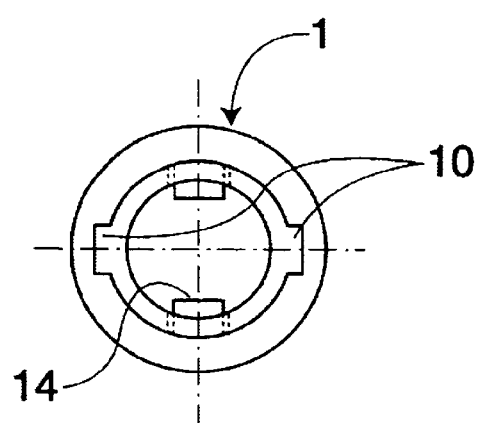
Figure 2B:
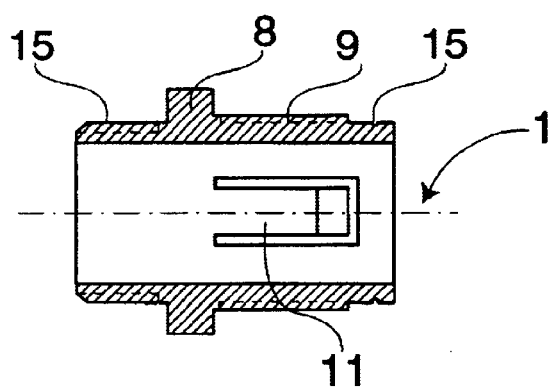

The body 1 of the safety quick connection shown in FIGS. 2a, 2b, 2c have an opening 7, a flange 8, a cylindrical wall 9 with two protections 10 provided at two end sides, and two plate-shaped deflectable tongues 11 provided on the opposite sides. Each tongue 11 has a conical cross-section on the upper part with a projection 13 extending substantially radially outwardly and a projection 14 extending radially inwardly. One end part of the body has an outer thread 14, while the opposite end part of the body is provided with a ring-shaped groove 16.

Figure 3:
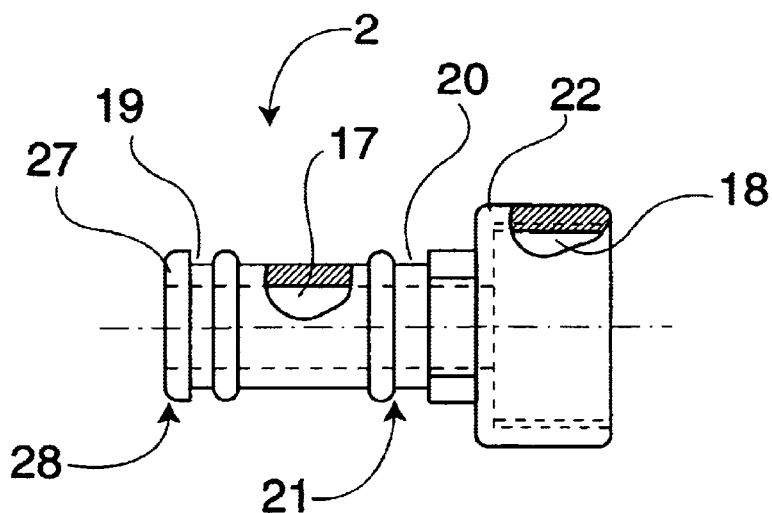
FIG. 3 is a partially sectioned side view of a fitting member of the inventive safety quick connection.

The fitting member 2 shown in FIG. 3 has a throughgoing opening 17, a threaded opening 18 and two grooves 19 and 20. One end wall of the groove 20 is provided with a rounded projection 21 formed for example by a radius. The groove 19 is limited by a side wall 27 with a rounded portion 28 formed for example by a radius. The threaded part of the fitting member has a flange 22.

Figures 4A, 4B:
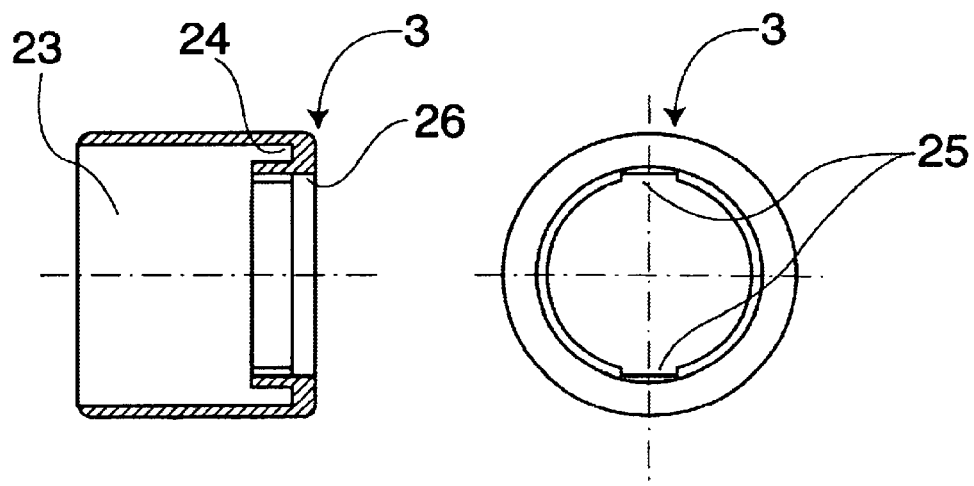
FIGS. 4a and 4b show a section side view and an end view of a closing member of the inventive safety quick connection.

The closing member 3 is shown in FIG. 4. It has an opening 23, an inner flange 24 which extends radially inwardly, two slots 25 located at opposite sides, and a ring-shaped groove 26.

The safety quick connection in accordance with the present invention operates in the following manner:

The body 1 with its threaded portion 15 is connected to a source of supply of liquid or gas, for example by a nut connected to a hose. The second component of the safety quick connection, namely the fitting member 2 is connected with a corresponding thread of the working element by the threaded opening 18. By moving of the closing member 3 with compression of the spring 5 to an extreme position, the inner flange 24 releases the tongue 11, so that the tongue 11 opens during movement of the fitting member 2 in the body 1, with action of the end wall 27 and the rounded portion 28 on the projection 14. During a further movement of the fitting member 2 inside the body 1 to the extreme working position, the groove 20 reaches the zone of the projection 14, and when the locking member 3 under the action of the spring 5 reaches its initial position, fixes the projection 14 in the groove 20.

When the fluid system operates under pressure, the fitting member 2 is urged to move out of the body 1. The end wall with the rounded portion 21 applies pressure against the projection 14 and presses the plate-shaped tongues 11 to the inner flange 24, and the projection 13 which is located in this region engages with the locking member 3 and an opening of the connection is prevented.

It will be understood that each of the elements described above, or two or more together, may also find a useful application in other types of constructions differing from the types described above.

While the invention has been illustrated and described as embodied in safety quick connection, it is not intended to be limited to the details shown, since various modifications sand structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A safety quick connector for connecting a source of fluid to a working element, comprising a body connectable to the fluid source and having an axis; a fitting member connectable to the working element and axially movable relative to said body; a locking member fixedly connected with said body for locking said body and said fitting member with one another in an assembled condition, said body having at least one radially deflectable tongue provided with a radially inwardly extending projection and a radially outwardly extending projection, said locking member having a radially outwardly projecting flange, said fitting member having a radially inwardly projecting portion, said projections of said body, said flange of said locking member and said portion of said fitting member being formed so that when fluid is supplied through the connection under pressure, said radially inwardly projecting portion of said fitting member applies pressure against said radially inwardly extending projection of said body and deflects radially outwardly said at least one deflectable tongue and therefore displaces radially outwardly said radially outwardly extending projection of said body so that said radially outwardly extending projection of said body abuts against said radially inwardly extending flange of said locking member and thereby locking member can not be displaced in an axial direction; and locking spring arranged between said body and said locking member.

2. A safety quick connector as defined in claim 1, wherein said fitting member has a groove located axially near said radially outwardly projecting portion and formed so that said radially inwardly extending projection of said body engages in said groove and thereby said locking member locks said body with said fitting member.

3. A safety quick connector as defined in claim 1, wherein said at least one deflectable tongue has a conical projection.

\* \* \* \* \*